(12) United States Patent
Nogami (10) Patent No.: US 6,442,436 B1
(45) Date of Patent: Aug. 27, 2002

(54) MULTI-TASKING SYSTEM, RECORDING MEDIUM IN WHICH PROGRAM THEREOF IS RECORDED, AND PROCESSING DEVICE

(75) Inventor: Taishi Nogami, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/696,480

(22) Filed: Oct. 24, 2000

(30) Foreign Application Priority Data

Oct. 25, 1999 (JP) .......................................... 11-302347

(51) Int. Cl.$^7$ ............................................. G05B 11/01
(52) U.S. Cl. ............................ 700/19; 700/20; 700/53; 700/174; 700/247; 700/177; 700/246; 709/100; 709/104; 709/106; 318/565; 318/567; 318/568.2
(58) Field of Search ........................... 700/2, 3, 18, 19, 700/20, 21, 23, 24, 25, 26, 52–53, 78–80, 246–247, 253, 255, 256, 185, 195, 174–178; 318/564, 565, 567, 568.2, 569; 709/104, 100, 106

(56) References Cited

U.S. PATENT DOCUMENTS

| | | | | |
|---|---|---|---|---|
| 4,791,554 A | * | 12/1988 | Hirota et al. ................... | 700/4 |
| 4,908,746 A | * | 3/1990 | Vaughan ....................... | 700/19 |
| 5,032,975 A | * | 7/1991 | Yamamoto et al. ............. | 700/5 |
| 5,122,717 A | * | 6/1992 | Hayashi ....................... | 318/569 |
| 5,812,133 A | * | 9/1998 | Schultz et al. ............... | 345/347 |
| 5,828,568 A | * | 10/1998 | Sunakawa et al. ............. | 700/83 |
| 5,844,795 A | * | 12/1998 | Johnston et al. .............. | 700/87 |
| 5,973,466 A | * | 10/1999 | Nogami et al. .............. | 318/569 |

FOREIGN PATENT DOCUMENTS

| | | |
|---|---|---|
| JP | 7-129418 | 5/1995 |
| JP | 8-263127 | 10/1996 |
| JP | 8-339211 | 12/1996 |

* cited by examiner

*Primary Examiner*—Ramesh Patel
(74) *Attorney, Agent, or Firm*—Rosalio Haro (57) ABSTRACT

A multi-tasking system in which tasks are grouped and the action of the safety function is different for each group so that the control of a machine can safely and easily be performed with one control device and that the monitoring of each device can be performed at all times, and a medium and a processing device in which a program thereof is recorded. A multi-tasking system 100 for controlling a plurality of tasks has a program executing unit 11 for processing a plurality of tasks by the multi-tasking processing and a task table 21 for keeping grouping information set for each of the plurality of tasks, and the program executing unit 11 has stop units (an emergency stop unit 16, a temporary stop unit 17 as the safety function, and the stop unit obtains grouping information from the task table 21 on the basis of a stop instruction and identifies a group of each task, and performs a different control for each group.

11 Claims, 10 Drawing Sheets

```
FUNCTION A

XQT B;REM START FUNCTION B AS CONTROLLING TASK
  XQT C;REM START FUNCTION C AS CONTROLLING TASK

EXTERN GLOBAL n AS INTEGER
  n = 0;  REM VARIABLE OF KEEPING NUMBER OF OPERATING
  TIMES OF ROBOT 1

SELRB 1;         REM SELECT ROBOT 1
  MOTOR ON
  DO
    GO .OPERATING POSITION 1
    GO .OPERATING POSITION 2
    n = n+1;       REM INCREASE NUMBER OF OPERATING TIMES
  LOOP

FEND
```

```
FUNCTION B

SELRB 2;         REM SELECT ROBOT 2
  MOTOR ON
  DO
    GO .OPERATING POSITION 3
    GO .OPERATING POSITION 4
  LOOP

FEND
```

```
FUNCTION C

DO
    ON CONVEYER
    SLEEP 3
    OFF CONVEYER
    SLEEP 1
  LOOP

FEND
```

```
FUNCTION D
  GLOBAL n AS INTEGER

DO
    PRINT PRINT "NUMBER OF OPERATING TIMES OF ROBOT 1"
    SLEEP 10
  LOOP

FEND
```

```
FUNCTION E

XQT D;REM START FUNCTION D AS MONITORING TASK

REM #21OUTPUT STATE, USING LINE RS-232C TO HOST COMPUTER,
  DO
    IF(STAT(0) AND &H100000) <> 0 THEN
      PRINT #21, "DURING STOPPING BY EMERGENCY STOP INPUT"
      OFF SAFETY INDICATING LAMP FORCED
    ELSE
      PRINT #21, "DURING APPLICATION NORMALLY OPERATING"
      ON SAFETY INDICATING LAMP FORCED
    ENDIF
    SLEEP 5
  LOOP

FEND
```

FIG. 4

①INITIAL STATE

| FUNCTION NAME | MAIN FUNCTION | BACKGROUND FUNCTION |
|---|---|---|
| functionA | | |
| functionB | | |
| functionC | | |
| functionD | | |
| functionE | | |

②AFTER SPECIFICATION OF FUNCTION A TO MAIN FUNCTION AND FUNCTION B TO BACKGROUND FUNCTION

| FUNCTION NAME | MAIN FUNCTION | BACKGROUND FUNCTION |
|---|---|---|
| functionA | ○ | |
| functionB | | |
| functionC | | |
| functionD | | |
| functionE | | ○ |

①AFTER APPLICATION INITIALIZATION

| TASK NUMBER | FUNCTION NAME | GROUP | EXECUTION STATE |
|---|---|---|---|
| | | | |
| | | | |
| | | | |
| | | | |

②JUST AFTER BACKGROUND FUNCTION STARTING

| TASK NUMBER | FUNCTION NAME | GROUP | EXECUTION STATE |
|---|---|---|---|
| 32 | Function E | MONITORING | DURING EXECUTION |
| | | | |
| | | | |
| | | | |

③AFTER FUNCTION D HAS BEEN STARTED FROM FUNCTION E

| TASK NUMBER | FUNCTION NAME | GROUP | EXECUTION STATE |
|---|---|---|---|
| 31 | Function D | MONITORING | DURING EXECUTION |
| 32 | Function E | MONITORING | DURING EXECUTION |
| | | | |
| | | | |

④JUST AFTER MAIN FUNCTION STARTING

| TASK NUMBER | FUNCTION NAME | GROUP | EXECUTION STATE |
|---|---|---|---|
| 1 | Function A | CONTROL | DURING EXECUTION |
| 31 | Function D | MONITORING | DURING EXECUTION |
| 32 | Function E | MONITORING | DURING EXECUTION |
| | | | |

⑤AFTER FUNCTION B HAS BEEN STARTED FROM FUNCTION A

| TASK NUMBER | FUNCTION NAME | GROUP | EXECUTION STATE |
|---|---|---|---|
| 1 | Function A | CONTROL | DURING EXECUTION |
| 2 | Function B | CONTROL | DURING EXECUTION |
| 31 | Function D | MONITORING | DURING EXECUTION |
| 32 | Function E | MONITORING | DURING EXECUTION |

⑥AFTER FUNCTION C HAS BEEN STARTED FROM FUNCTION A

| TASK NUMBER | FUNCTION NAME | GROUP | EXECUTION STATE |
|---|---|---|---|
| 1 | Function A | CONTROL | DURING EXECUTION |
| 2 | Function B | CONTROL | DURING EXECUTION |
| 3 | Function C | CONTROL | DURING EXECUTION |
| 31 | Function D | MONITORING | DURING EXECUTION |
| 32 | Function E | MONITORING | DURING EXECUTION |

BEFORE EMERGENCY STOP

| TASK NUMBER | FUNCTION NAME | GROUP | EXECUTION STATE |
|---|---|---|---|
| 1 | Function A | CONTROL | DURING EXECUTION |
| 2 | Function B | CONTROL | DURING EXECUTION |
| 3 | Function C | CONTROL | DURING EXECUTION |
| 31 | Function D | MONITORING | DURING EXECUTION |
| 32 | Function E | MONITORING | DURING EXECUTION |

AFTER EMERGENCY STOP

| TASK NUMBER | FUNCTION NAME | GROUP | EXECUTION STATE |
|---|---|---|---|
| 31 | Function D | MONITORING | DURING EXECUTION |
| 32 | Function E | MONITORING | DURING EXECUTION |
|  |  |  |  |
|  |  |  |  |

① BEFORE TEMPORARY STOP

| TASK NUMBER | FUNCTION NAME | GROUP | EXECUTION STATE |
|---|---|---|---|
| 1 | Function A | CONTROL | DURING EXECUTION |
| 2 | Function B | CONTROL | DURING EXECUTION |
| 3 | Function C | CONTROL | DURING EXECUTION |
| 31 | Function D | MONITORING | DURING EXECUTION |
| 32 | Function E | MONITORING | DURING EXECUTION |

② DURING TEMPORARY STOP

| TASK NUMBER | FUNCTION NAME | GROUP | EXECUTION STATE |
|---|---|---|---|
| 1 | Function A | CONTROL | TEMPORARY STOP |
| 2 | Function B | CONTROL | TEMPORARY STOP |
| 3 | Function C | CONTROL | TEMPORARY STOP |
| 31 | Function D | MONITORING | DURING EXECUTION |
| 32 | Function E | MONITORING | DURING EXECUTION |

③ AFTER RESTART

| TASK NUMBER | FUNCTION NAME | GROUP | EXECUTION STATE |
|---|---|---|---|
| 1 | Function A | CONTROL | DURING EXECUTION |
| 2 | Function B | CONTROL | DURING EXECUTION |
| 3 | Function C | CONTROL | DURING EXECUTION |
| 31 | Function D | MONITORING | DURING EXECUTION |
| 32 | Function E | MONITORING | DURING EXECUTION |

MULTI-TASKING SYSTEM, RECORDING MEDIUM IN WHICH PROGRAM THEREOF IS RECORDED, AND PROCESSING DEVICE

BACKGROUND OF THE INVENTION

1. Field of the Invention

The present invention relates to a multi-tasking system, and a medium and a processing device in which a program thereof is recorded, and more particularly, relates to a multi-tasking system having a safety function, and a medium and a processing device in which a program thereof is recorded.

2. Description of the Prior Art

Previously, when controlling a system having a plurality of devices such as a robot or a peripheral device, a multi-tasking system has widely been utilized, which has a multi-tasking function of simultaneously executing a plurality of programs (tasks). Japanese Patent Laid-Open No. 7-129418 discloses a program control system in a multi-tasking environment, in which parental relation is set between programs corresponding to respective devices and a subtask is automatically executed when a main task is started, so as to make it easy to start a plurality of programs. Furthermore, Japanese Patent Laid-Open No. 8-263127 discloses a numerical controller, in which tasks are constituted separately by a task including a command to an external device with the communication function and a task including a command relating to the robot control, so as to make a program easily by the separate constitution of the task relating to the communication and the task relating to the control. Furthermore, Japanese Patent Laid-Open No. 8-339211 discloses a control device in an automatic machine, in which a monitoring task for monitoring the error state of the total system is provided besides a task for controlling each device such as a robot, and the above described monitoring task is processed in parallel with a task allocated to each device, so that even when any device causes an error, a suitable processing can immediately be ordered to each task according to contents thereof.

By the way, an emergency stop switch, a temporary stop switch, a safety guard, or the like for insuring safety is generally connected to a controller for controlling a device such as a machine tool or an industrial robot by a multi-tasking, and it has a safety function such as emergency stop means which stops a robot by cutting off the electric power supplied to a driving motor of the movable portion and simultaneously stops a task in the case where the emergency stop switch is pressed down or the door of the safety guard is opened, or temporary stop means which temporarily stops the robot and task.

In the case where such a safety function is used in a controller to which for example, a control system disclosed in Japanese Patent Laid-Open No. 7-129418 is applied, a main task is stopped first, and a subtask is consequently stopped. Thus, in the prior art, it is configured that all tasks are stopped when the safety function is actuated, and there is no consideration of continuing the execution of part of tasks such as the communication processing with a host computer, whose execution is wanted even when the safety function is actuated. Accordingly, there has been such a problem that the state of a machine cannot be transmitted to the operator or the host computer at the time of an emergency stop or a temporary stop and that a sufficient monitoring cannot be performed.

The device disclosed in Japanese Patent Laid-Open No. 8-263127 is a device in which a task relating to the communication with an external device is configured apart from a task for controlling a machine, but the tasks are merely configured separately. Therefore, it does not perform such different controls for respective tasks that the execution is continued as for a task of a necessary part like a task relating to the communication even when the safety function is actuated as mentioned above, and other tasks relating to the machine control are stopped as usual.

Herein, in order to avoid the above described stop of all tasks, there is an effective method of programming the safety function by the user without using the safety function on the controller side as disclosed in Japanese Patent Laid-Open No. 8-339211, or of constructing a system by using a controller for each device such as a robot. However, in case of the former method, the danger because of program errors cannot be avoided, and further, if the monitoring task is stopped there is a possibility of occurrence of such a very dangerous state that the task for operating the robot cannot be stopped, and the robot is not stopped even when the emergency stop switch is pressed. Furthermore, in case of the latter method, the cost is raised since a plurality of controller are necessary, and in addition to that, there is such a problem that the synchronous processing is required between controllers and the program becomes complicated.

BRIEF SUMMARY OF THE INVENTION

Object of the Invention

The present invention is made in consideration of such a viewpoint, and it is an object to provide a multi-tasking system in which the control of devices is safely and easily performed with one controller by making the action of the safety function different for each group to which each task belongs and in which each device can be monitored at all times, and a medium and a processing device in which a program for the system is recorded.

SUMMARY OF THE INVENTION

A multi-tasking system according to the present invention is a multi-tasking system for controlling a plurality of tasks, and it has program executing means which processes a plurality of tasks by the multi-tasking processing and a task table which keeps grouping information set for each of the plurality of tasks. The program executing means has stop means as a safety function, and the stop means obtains the grouping information from the task table in accordance with a stop instruction, identifies each group of the tasks, and performs a different control for each group.

Furthermore, the stop means of the multi-tasking system according to the present invention terminates or temporarily stops the execution of the tasks belonging to a first group identified on the basis of the grouping information of the task table, and continues the execution of the tasks belonging to a second group.

Moreover, the first group of the multi-tasking system according to the present invention is a machine controlling group including tasks for controlling devices, and the second group is a machine monitoring group including tasks for performing the monitoring processing or communication processing.

Herein, device means, for example, a machine with a movable portion.

The multi-tasking system according to the present invention is a multi-tasking system for controlling a plurality of tasks, and it has program executing means which processes a plurality of tasks by the multi-tasking processing and a task table which keeps the group information as for which of the machine monitoring group including tasks for monitoring processing of devices or communication processing with an external device and the machine controlling group including tasks for controlling operation of devices, each of the plurality of tasks belongs to, and the state information as for which of various states including the executing state and the temporary stop state, each of the plurality of tasks exists in. The program executing means has emergency stop means and temporary stop means as the safety function. The emergency stop means accesses the above described task table in accordance with an emergency stop instruction to identify a group to which each task belongs, terminates tasks belonging to the machine controlling group and renews contents of the above described task table. The temporary stop means accesses the task table in accordance with a temporary stop instruction to identify a group to which each task belongs, temporarily stops tasks belonging to the machine controlling group and renews contents of the task table. The emergency stop means and temporary stop means have a function to continue the executing state of the tasks belonging to the machine monitoring group.

Furthermore, the multi-tasking system according to the present invention is a multi-tasking system provided with display means for displaying contents of the task table.

A recording medium according to the present invention is a recording medium, wherein a program for functioning as any one of the above described respective multi-tasking systems is recorded.

A processing device according to the present invention has at least any one of the above described respective multi-tasking systems, a first device controlled by the machine controlling group, and a second device controlled by the machine monitoring group, and controls stop or continuation for each group to which respective devices belong by the stop means in the multi-tasking system.

According to the present invention, different controls are performed for each group to which respective tasks belong by the stop means as a safety function, so that it is possible to perform a control complying with the level of safety required in each group.

Furthermore, the stop means does not terminate or temporarily stop tasks of all groups, but it terminates or temporarily stops only the tasks of a certain group in accordance with a stop instruction. Therefore, for example, if a task for controlling a machine with a movable portion is classified into the above described group, it is possible to continue a desired monitoring while keeping safety. Furthermore, since such controls of termination and temporary stop of tasks are performed by the stop means of the program executing means, the danger because of a program error can be avoided, and a safer system can be configured, in comparison with a conventional method in which the user programs the safety function.

Furthermore, by the safety function of the program executing means, tasks belonging to the machine controlling group to control devices are terminated, and tasks belonging to the machine monitoring group to perform monitoring processing and communication processing are continued. Therefore, the controls of devices can safely and easily be performed by one program executing means, and it is also possible to monitor each device at all times.

DETAILED DESCRIPTION OF THE PREFERRED EMBODIMENTS

Figure 1:
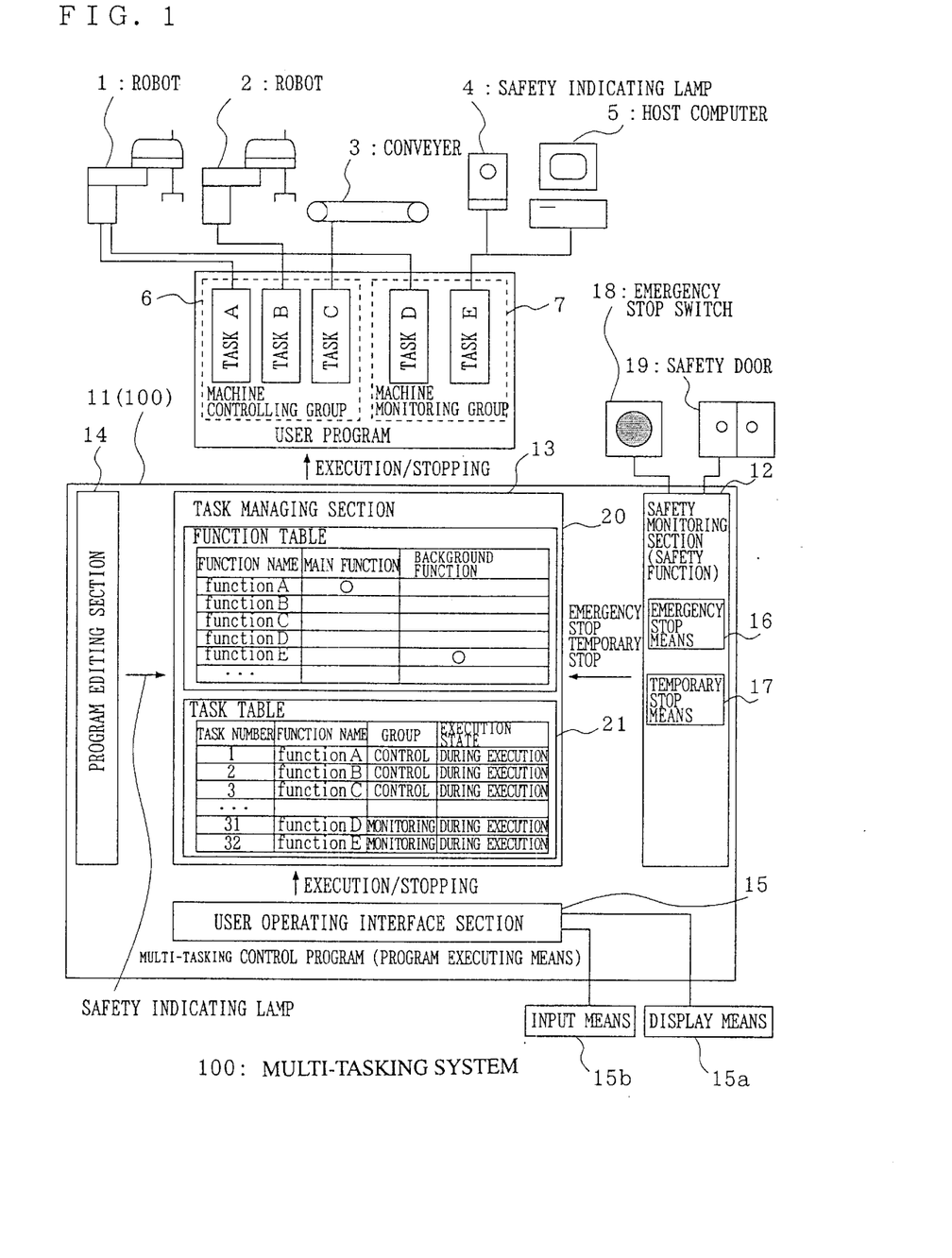
FIG. 1 is a drawing showing one example of a system configuration including a multi-tasking system of one embodiment of the present invention.

FIG. 1 is a drawing showing one example of a system configuration including a multi-tasking system of one embodiment of the present invention.

The present embodiment will be described in a case where, as an example of grouping, tasks are divided into a machine controlling group which performs control of a machine with a movable portion and a machine monitoring group which performs monitoring processing of a machine and communication processing with a host computer.

A multi-tasking system 100 is configured to control two robots (robot 1, robot 2) and a conveyer 3 each of which has a movable portion, and it is connected to a safety indicating lamp 4 and a host computer 5. Reference numeral 6 denotes a machine controlling group comprising tasks for controlling a machine, and here, it includes a task A for controlling the robot 1, a task B for controlling the robot 2, and a task C for controlling the conveyer, 3. Reference numeral 7 denotes a machine monitoring group comprising tasks for performing monitoring processing of a machine and communication processing with the host computer 5, and here, it includes a task D for monitoring the robot 1 and a task E for performing on-off of the safety indicating lamp 4 and communication with the host computer 5. These respective tasks are user programs prepared by a user, and they are divided into groups by the user. Herein, the tasks of the machine controlling group 6 may include a monitoring command or a communication command besides a command for performing the machine control, but the tasks of the machine monitoring group 7 does not include any command for controlling a machine.

Reference numeral 11 denotes program executing means to be realized by a CPU (not shown in the figure) capable of performing a multi-tasking processing and a multi-tasking control program (hereafter, referred to simply as an application) having a safety function, and as shown in the figure, it is configured to include a safety monitoring section 12, a task managing section 13, a program editing section 14, and a user operating interface section 15.

The safety monitoring section (safety function) 12 is a part for stop tasks and machines (robot 1, robot 2, and conveyer 3) regardless of a command programmed in each task, and it has emergency stop means 16 and temporary stop means 17. The emergency stop means 16 cuts off the power supply to a driving motor (not shown in the figure) of a machine to stop the machine, and in the meantime, it stops (hereafter, referred to as "terminate" for avoiding the confusion with "temporary stop") tasks belonging to the machine controlling group 6, for example, in the case where the emergency stop switch 18 is pressed down, or the safety guard 19 is opened. The temporary stop means 17 temporarily stops machines and tasks belonging to the machine controlling group 6, for example, in the case where the temporary stop button is pressed. Herein, both the emergency stop means 16 and the temporary stop means 17 allow the execution of the tasks belonging to the machine monitoring group 7 to continue.

The task managing section 13 is a part for managing tasks on the basis of a function table 20 and a task table 21. In the function table 20, all functions (tasks) programmed by the user are registered, and the specified information of the main function and background function to be described in detail later is also stored. In the task table 21, the task number, function name, grouping information (identification information of which group a task belongs to), and state of a task are stored.

The program editing section 14 is a part for editing a user program. The user operating interface section 15 is a part for providing a GUI environment which makes it possible to perform an operational input by using display means 15a and input means 15b.

The program executing means 11 configured as mentioned above executes a plurality of functions (tasks) registered in the function table 20 by the multi-tasking processing. Furthermore, the program executing means 11 has an error detecting function for detecting a grouping violation of each task or the like, and in the case where an operating command of a machine is included in a task belonging to the machine monitoring group 7, it interrupts the execution and displays an error. Herein, prior to the error detection at the time of this execution, the error detection has also been performed at the time of the task registration to be described in detail below. Consequently, the robot operating commands such as GO or JUMP cannot be executed in the tasks belonging to the machine monitoring group 7, by performing the error check at two stages of the task registration and execution.

Figure 2:
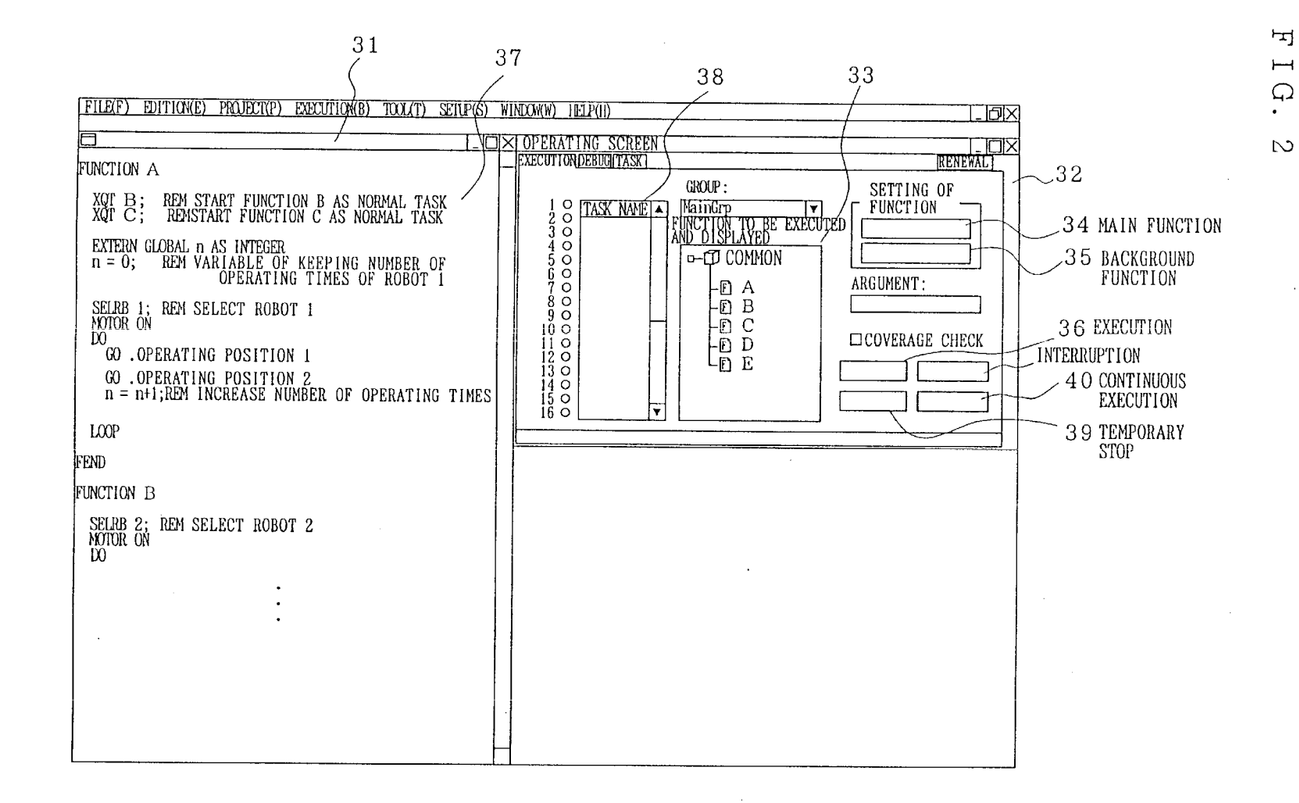
FIG. 2 is a drawing showing one example of a display screen by an application.

FIG. 2 is a drawing showing one example of a display screen by an application, and reference numeral 31 denotes an editor screen, and reference numeral 32 denotes an operator operating screen. The procedure for classifying tasks into the machine controlling group 6 and the machine monitoring group 7 will be described below in the order of (1) Preparation of tasks and (2) Registration of tasks.

(1) Preparation of tasks (functions)

A task is prepared by executing a function, and this function is a user program prepared by the editor screen 31.

Figure 3:
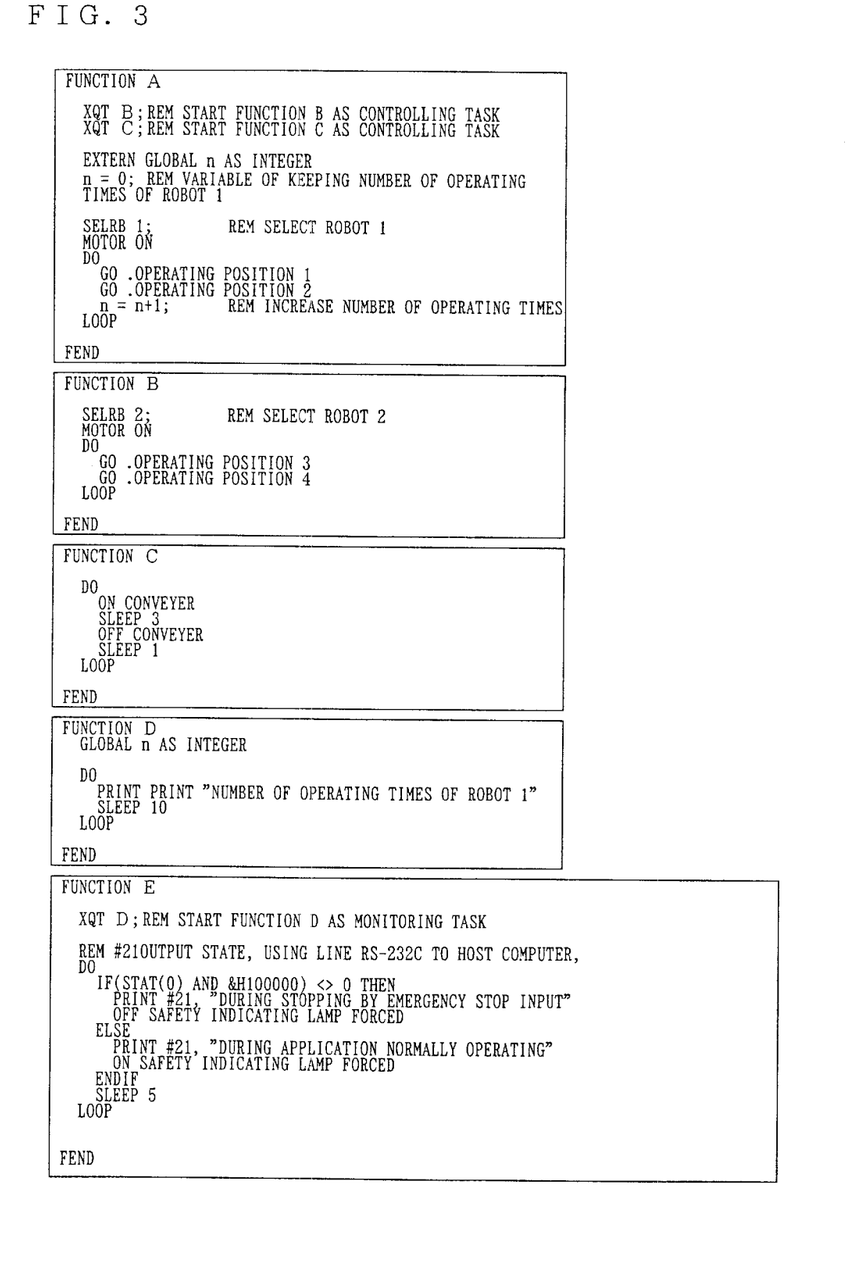
FIG. 3 is a drawing showing one example of a user program.

FIG. 3 is a drawing showing one example of a user program, and in the drawing, five functions of A to E are exemplified. Herein, these functions A to E correspond to the tasks A to E in FIG. 1, respectively, the function A is a program which starts the functions B and C by a command (XQT) for ordering an execution of another function and in the meantime, gives an operating instruction to the robot 1, the function B and function C are programs which give operating instructions to the robot 2 and conveyer 3, respectively, and the function D is a program which performs monitoring of the robot 1. The function E is a program which starts the function D and in the meantime, executes an ON-OFF command of the safety indicating lamp 4 even at the time of an emergency stop. This ON-OFF command is configured so as not to be executed at the time of an emergency stop in the case of being used in the default, but it can forcedly be executed even at the time of an emergency stop by using key word FORCED. It is possible to execute an ON-OFF command by using the key word FORCED to such a device to which the execution of an ON-OFF command is wanted even at the time of an emergence stop as the safety indicating lamp 4 shown in the function E.

(2) Registration of Tasks (Functions)

The function prepared by the editor screen 31 is automatically registered in the function table 20 by the program editing section 14, and as shown in a function list screen 33 of FIG. 2, the registered function name is displayed. Then, the operator specifies the main function and background function one by one by performing a specific operation using buttons 34, 35 on the operator operating screen 32. The function specified to the main function is started as a task of the machine controlling group 6 when the operator presses down an executing button 36, and the function specified to the background function is automatically started as a task of the machine monitoring group 7 at the time when the application has been started and the initialization has been ended.

Incidentally, in the case where a command for starting another task is included like the function A, the group specification for a main task is also reflected for a subtask, and the task B and task C started as subtasks are classified as the same group as the main task A. Thus, tasks are classified into the machine monitoring group 7 or the machine controlling group 6 by specifying the main function and background function.

Here, when specifying the function A to the main function and specifying the function E to the background function, the function A becomes a task of the machine controlling group 6, and the subtask B and the subtask C whose main task is the function A also become tasks of the machine controlling group 6. Furthermore, the function E becomes a task of the machine monitoring group 7, and the subtask D whose main task is the function E also becomes a task of the machine monitoring group 7.

Figure 4:
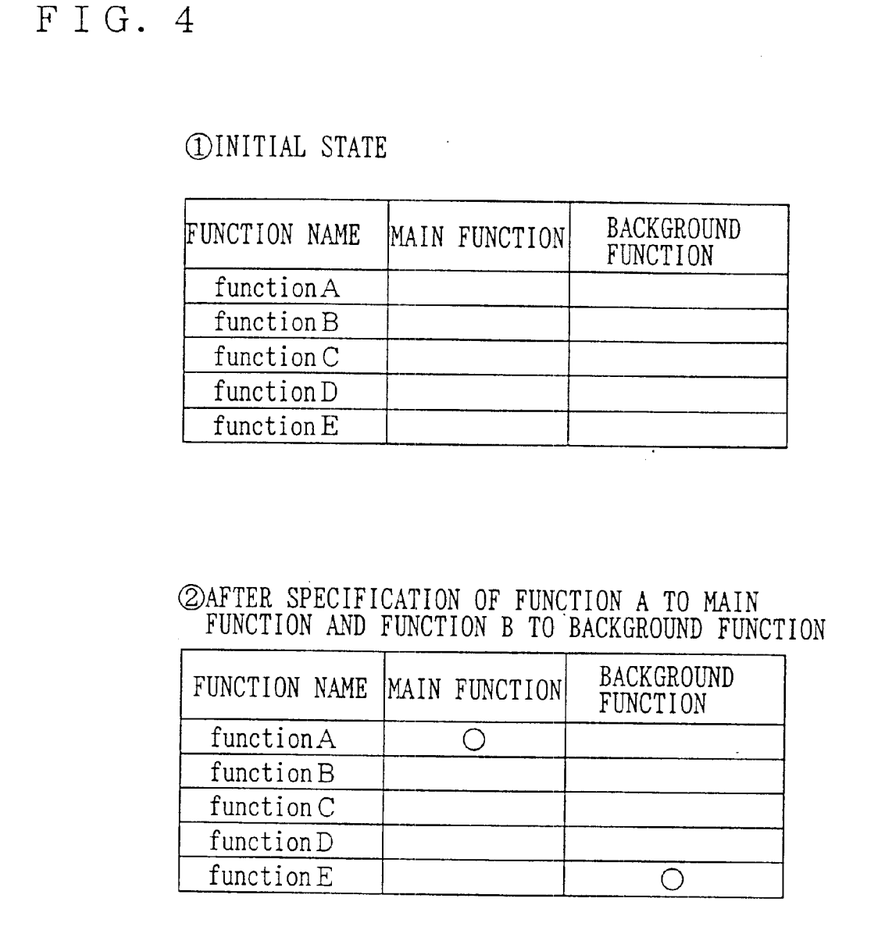
FIG. 4 is a drawing showing function tables before and after specifying a main function and background function.

FIG. 4 is a drawing showing function tables before and after being specified in which mark [○] is written in each specified function so that the function table 20 is renewed.

At the time of the above described task registration, an error check is performed by the program executing means 11 to check whether a robot operating command is included in a function specified to the background function, and display an error in the case of being included. In case of the present example, an error is displayed in the case where the function A is specified to the background function. Herein, the object of the error detection is only the specified function, and a subtask whose main task is the above described function is not an object. The reason is because the group determination of a function to be started as a subtask is performed only when it has been started from the main task, so that it is difficult to detect the grouping violation in the state where the group determination has not been performed. Therefore, as mentioned above, it is arranged to be able to find out the grouping violation error without fail by performing the error detection both at the time of registration and at the time of execution.

Figure 5:
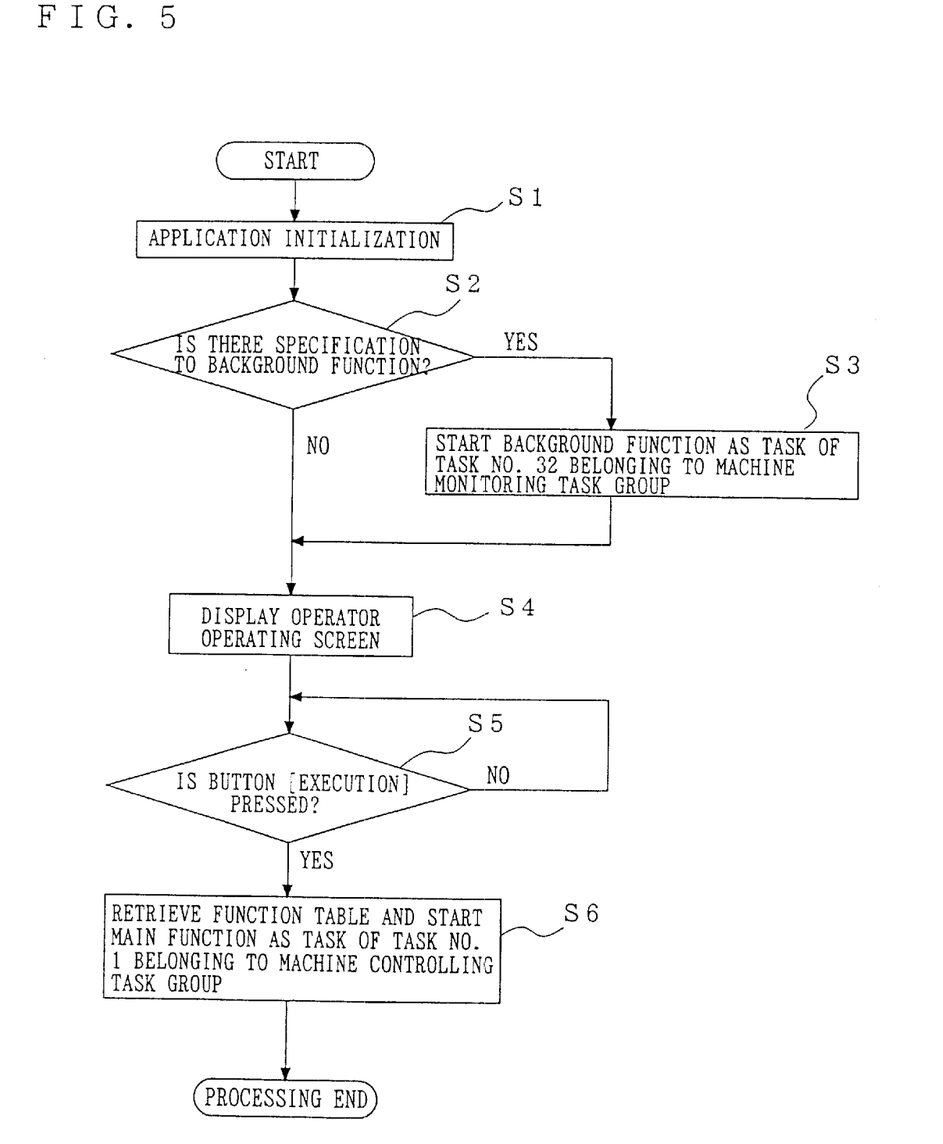
FIG. 5 is a flow chart showing a starting procedure of a task.

FIG. 5 is a flow chart showing the starting procedure of a task prepared and registered as mentioned above, provided that a maximum of 32 tasks can be executed, task numbers in rising order from task No. 1 are allocated to tasks of the machine controlling group 6, and tasks numbers in the falling order from task No. 32 are allocated to tasks of the machine monitoring group 7.

When an application is started, the program executing means 11 performs the initialization of the application (S1), and next, it retrieves the function table 20 to judge whether the background function is specified or not (S2). Here, since the function E is specified, the function E is started as a task (task E) of task No. 32 belonging to the machine monitoring group 7 (S3), and the operator operating screen 32 is displayed (S4). At this moment, the started task E starts the function D as a task (task D) of task No. 31 belonging to the machine monitoring group 7. Then, when the executing button 36 for starting the robot operation is pressed, the function table 20 is retrieved and the function A specified as the main function is started as a task (task A) of task No. 1 belonging to the machine controlling group 6 (S5). By this task A, the function B and the function C are started in turn as tasks of task No. 2 and task No. 3 belonging to the machine controlling group 6, respectively.

Thus, the configuration is made so that the monitoring processing and communication processing can be started from the starting time of the multi-tasking system 100 by automatically starting the function specified as the background function, that is, a task belonging to the machine monitoring group 7, at the application start-up time.

Figure 6:
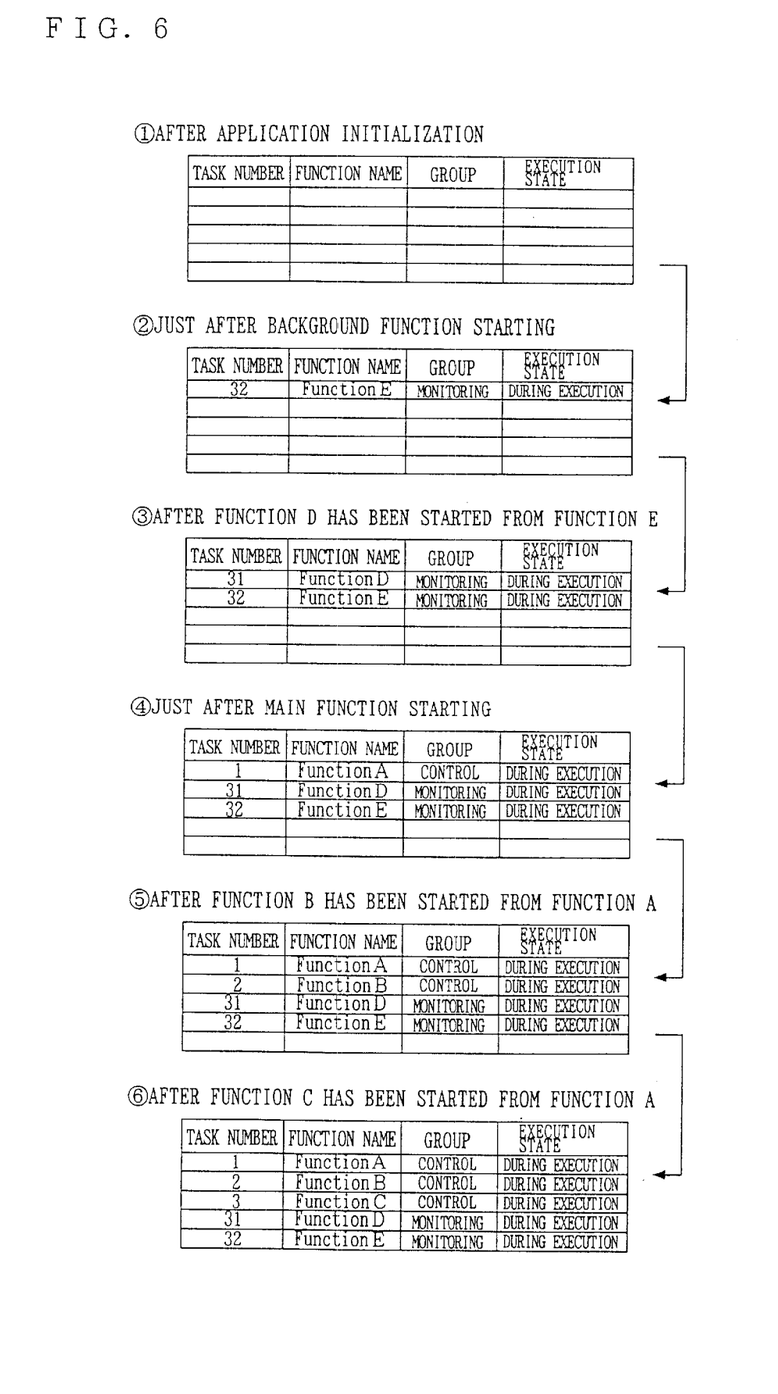
FIG. 6 is a drawing showing task tables in respective states.

FIG. 6 is a drawing showing the task table in each state, and in the figure, <1> shows the task table 21 after the initialization of an application, <2> shows the task table 21 after the starting of the background function, <3> shows the task table 21 after the function D has been started from the function E, <4> shows the task table 21 just after the starting of the main function, <5> shows the task table 21 after the function B has been started from the function A, and <6> shows the task table 21 after the function C has further been started from the function A. Thus, the task table 21 is renewed in turn by the task information in each state.

Figure 7:
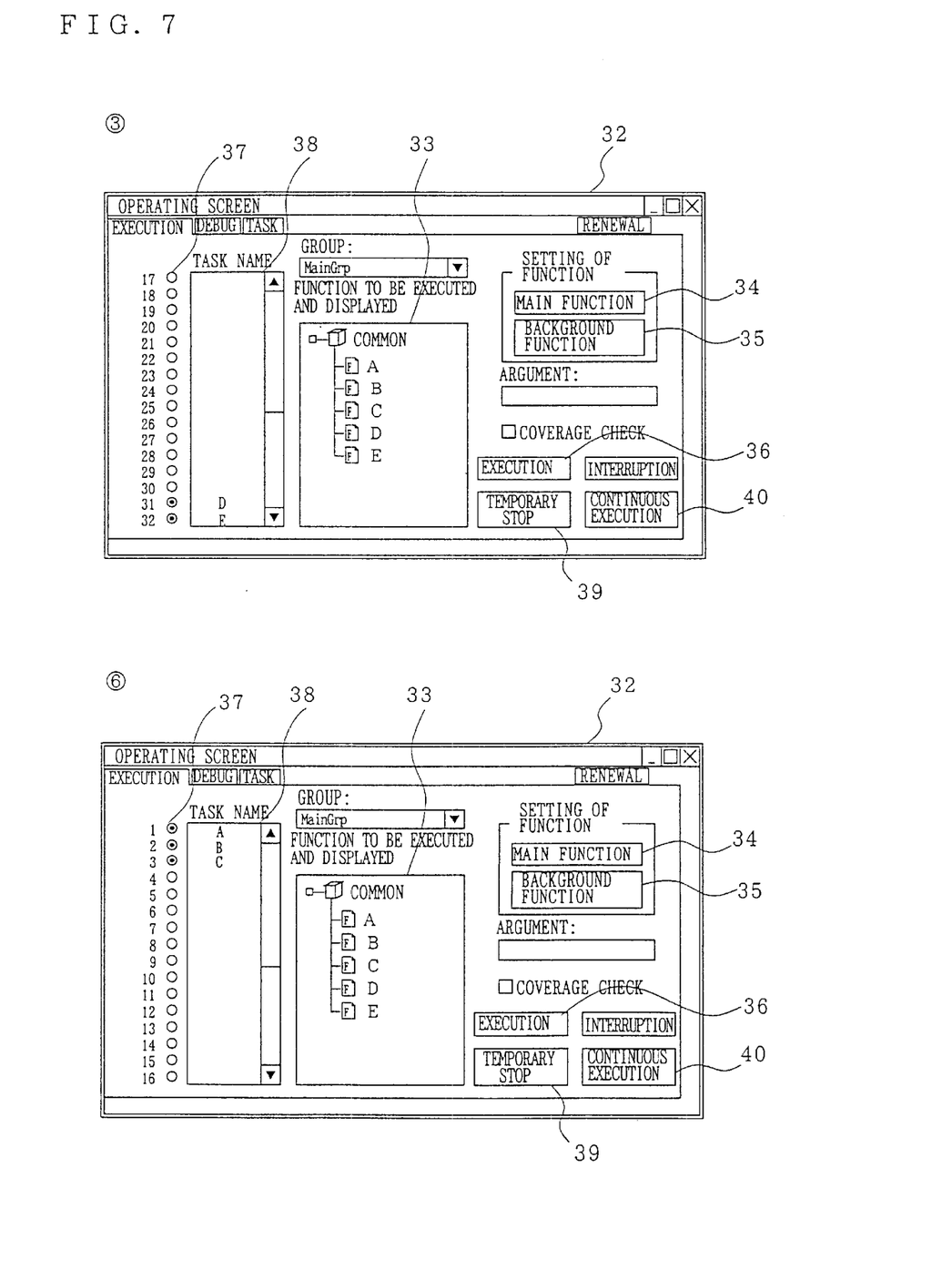
FIG. 7 is a drawing showing one example of an operator operating screen on which contents of a task table are displayed.

FIG. 7 is a drawing showing one example of an operator operating screen displaying contents of the task table, and especially, it shows examples of the display in the state of <3> in FIG. 6 and the state of <6> in FIG. 6. In the state of <3>, the tasks D, E during the starting are displayed in the task list screen 38, and a task marker 37 of each corresponding task number is checked. In the state of <6>, the tasks A, B, C are further additionally displayed. Herein, the character color of the task list screen 38 is displayed differently according to the group to which each task belongs, and further, the display color of the task marker 37 is displayed differently according to the state of each task (during the execution and during the temporary stop (to be described later)), which are not shown in the figure, and the user can confirm the contents of the task table 21 by the operator operating screen 32.

Next, a flow of the processing at the time of an emergency stop will be described while referring to drawings.

Figure 8:
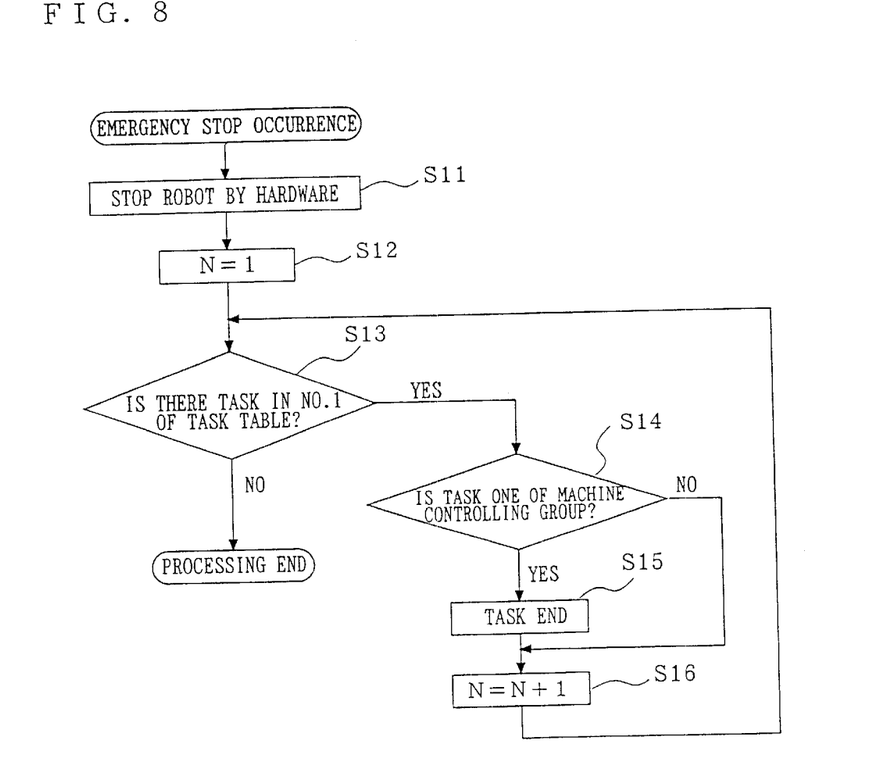
FIG. 8 is a flow chart showing a flow of processing at the time of an emergency stop.

FIG. 8 is a flow chart showing the flow of the processing at the time of an emergence stop.

When an emergency stop instruction such as a pressing-down of the emergency stop switch 18 by the operator is issued, the emergency stop means 16 stops the robot 1, robot 2, and conveyer 3 by using a hardware (S11). Then, it is checked from No. 1 whether there is a task in the task table or not (S12, S13), and if there is a task, it is judged in succession whether the task belongs to the machine controlling group 6 or not (S14). If the task belongs to the machine controlling group 6, the task is terminated (S15), and if the task belongs to the machine monitoring group 7, the execution is continued to return to step S13 and perform similar processing in the next data (S16). This is repeated, and when coming to No. N where there is no task, the processing at the time of an emergency stop is ended.

Figure 9:
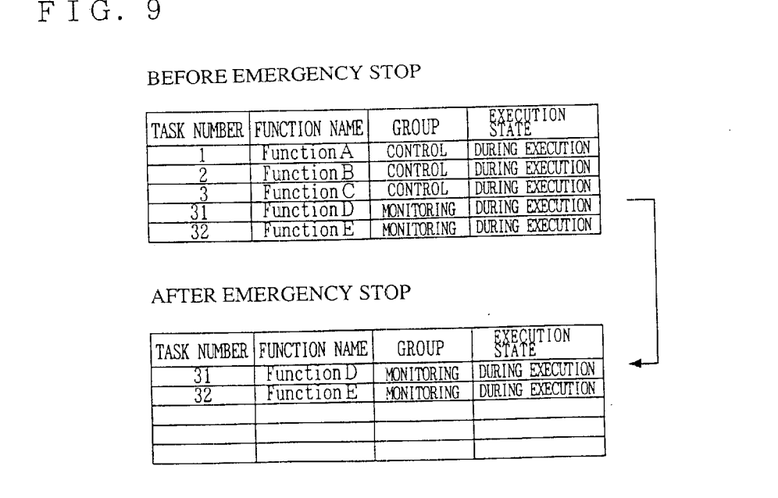
FIG. 9 is a drawing showing task tables before and after the emergency stop.

FIG. 9 is a drawing showing the task tables before and after the emergency stop, and the tasks (task No. 1, task No. 2) of the machine controlling group 6 existing before the emergency stop are eliminated from the task table 21 after the emergency stop.

Next, a flow of the processing at the time of a temporary stop will be described while referring to drawings.

Figure 10:
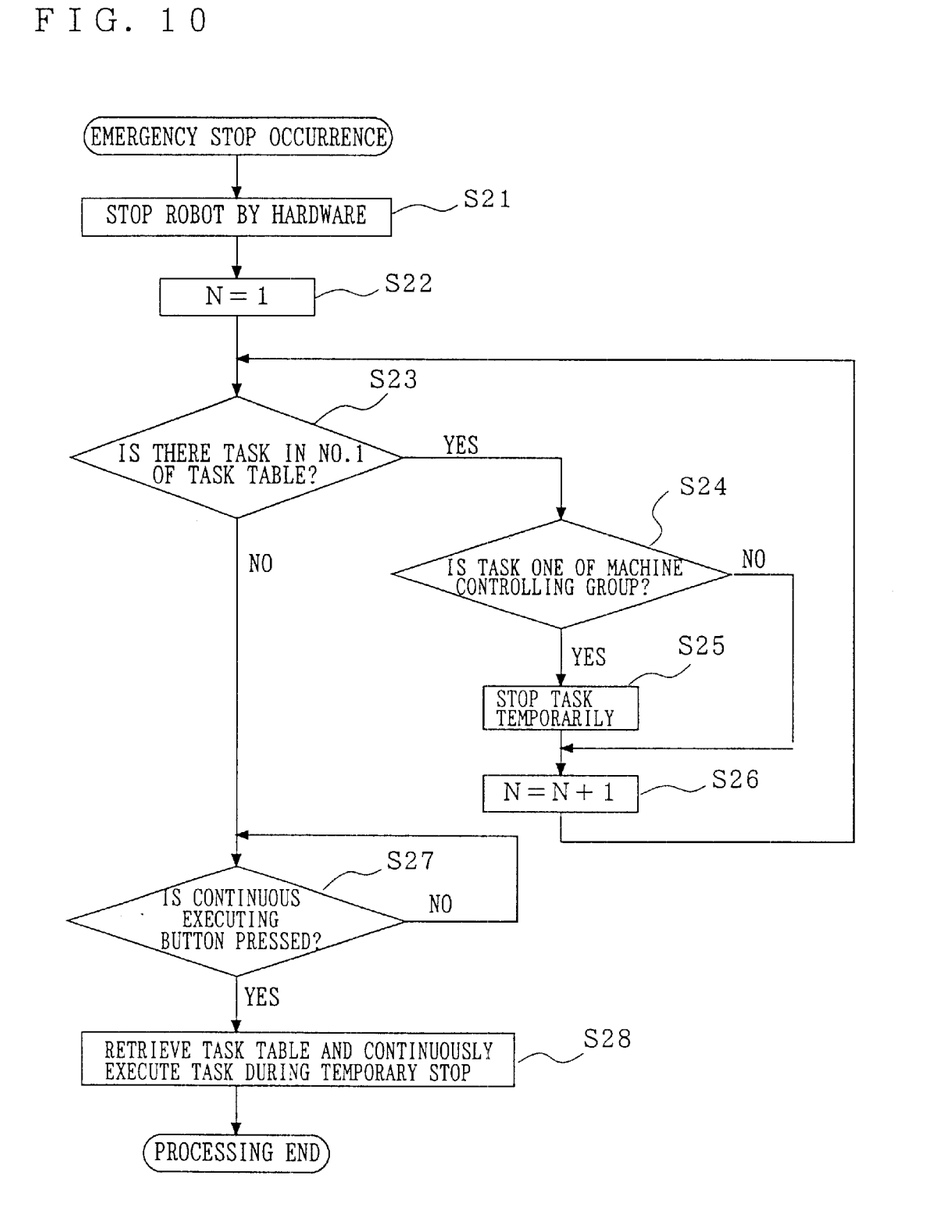
FIG. 10 is a flow chart showing a flow of processing at the time of a temporary stop.

FIG. 10 is a flow chart showing the flow of the processing at the time of the temporary stop.

When a temporary stop instruction such as a pressing-down of the temporary stop button 39 by the operator is issued, the temporary stop means 17 stops the robot 1, robot 2, and conveyer 3 by using a hardware (S21). Then, it is checked from No. 1 whether there is a task in the task table 21 or not (S22, S23), and if there is a task, it is judged whether the task belongs to the machine controlling group 6 or not (S24). If the task belongs to the machine controlling group 6, the task is temporarily stopped (S25), and if the task belongs to the machine monitoring group 7, the execution is continued to return to step S23 and perform similar processing in the next data (S26). This is repeated, and when coming to No. N where there is no task, the processing for temporarily stop the task of the machine monitoring group 7 is ended, to wait for the pressing-down of the continuous executing button 40. Then, when the continuous executing button 40 is pressed down (S27), the task table 21 is retrieved and the task at the temporary stop is continuously executed (restarted), and the processing at the time of a temporary stop is ended.

Figure 11:
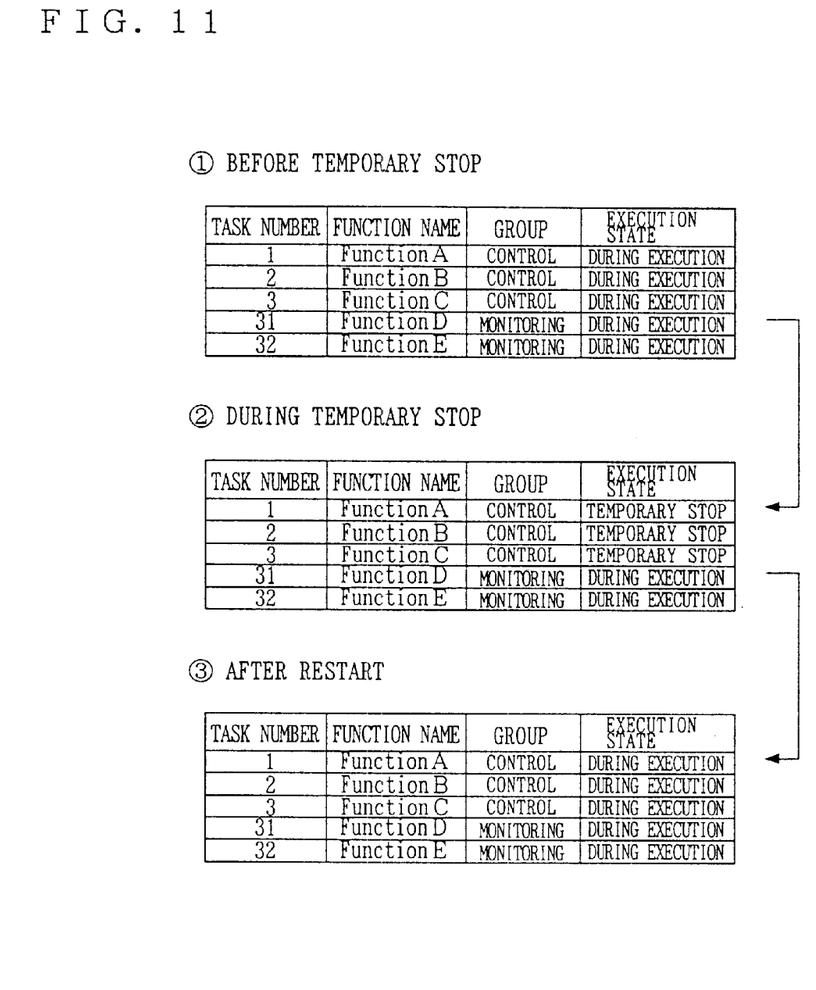
FIG. 11 is a drawing showing task tables before the temporary stop, during the temporary stop, and after restart.

FIG. 11 is a drawing showing the task tables before a temporary stop, during the temporary stop, and after the restart. As shown in the figure, the state of tasks Nos. 1, 2 and 3 of the machine controlling group 6 changes to the state of the temporary stop from the state of the execution, and when restarted, it changes to the state of the execution from the state of the temporary stop.

Thus, according to the present embodiment, since each task is grouped to perform a different control for each group, it is possible to perform a control complying with the safety level required for each group. As mentioned above, it is concretely arranged that tasks of such a group as the machine controlling group 6 to control a machine with a movable portion are terminated or temporarily stopped, while tasks of the other machine monitoring group 7 are continuously executed. Consequently, the monitoring and communication processing in the machine monitoring group 7 can be continued while the safety for the machine controlled by the machine controlling group 6 is surely kept.

Furthermore, since such a control as termination or temporary stop of a task is performed by the safety function of the program executing means 11, the danger because of a program error can be avoided in comparison with a method of programming the safety function by the user, so that a safer system can be formed. Furthermore, since there is only one program executing means 11, a simple system with easy programming can be formed.

Furthermore, even in the case where an emergency stop or a temporary stop is ordered, all tasks are not terminated and that tasks belonging to the machine monitoring group 7 continue the execution. Therefore, even when the safety function is actuated, the state of the robot 1, robot 2, and conveyer 3 can be monitored. Furthermore, it is possible for the user to customize the display form, for example, to flash the safety indicating lamp 4 on and off during the emergency stop or the temporary stop, depending on the program of the task of the machine monitoring group 7.

Furthermore, since the task belonging to the machine monitoring group 7 starts simultaneously with the end of the initialization of the application, it is possible to flash the safety indicating lamp 4 on and off as described above or to display a warning message, in the case where of an emergency stop state at the start-up time of the multi-tasking system 100.

Furthermore, since the communication with the host computer 5 is possible at all times, the remote-control by the host computer 5 is possible, and further, in the case where any error occurs during the unmanned operation, for example, on a holiday or at night, the occurrence of an error can be transmitted by an electronic mail.

Furthermore, in the present embodiment, a case of classifying each task into two groups of the machine controlling group 6 and the machine monitoring group 7 has been described as an example, but it is not limited to this. For example, it is also possible to group the tasks into three groups such as the machine controlling group I, the machine controlling group II, and the machine monitoring group. Furthermore, a case of gathering the control of every machine with a movable portion in one group (machine controlling group 6) has been described as an example, but for example, it is also possible to make the machine controlling group I control the robot 1 and robot 2, and the machine controlling group II control the conveyer. If the tasks are grouped like this and an emergency stop switch is provided for each group, it is possible to stop only the machines of a group to which the corresponding emergency stop switch is pressed down, so that a plurality of machine controlling groups can be independently controlled.

What is claimed is:

1. A multi-tasking system for controlling a plurality of tasks, comprising:
    a program executing means which processes a plurality of tasks by multi-tasking; and
    a task table which keeps, for each of said plurality of tasks, at least the following information:
        a) grouping information according to a task group in which the task is included, said task group being either a machine monitoring group including a task for monitoring a device and a task for processing communications with an external device or a machine controlling group including a task for controlling operation of a device, and
        b) state information specifying one of various states in which the task is active, said various states including a state of execution and a state of temporary stop; wherein
    said program executing means includes an emergency stop means and a temporary stop means as a safety function;
    said emergency stop means accesses said task table in accordance with an emergency stop instruction to identify the task group that includes each task, terminates a task included in the machine controlling group and updates contents of said task table;
    said temporary stop means accesses said task table in accordance with a temporary stop instruction to identify the task group that includes each task temporarily stops a task included in the machine controlling group and updates contents of said task table; and
    said emergency stop means and temporary stop means further include a function to continue an executing state of a task included in the machine monitoring group.

2. A multi-tasking system for controlling a plurality of tasks, comprising:
    a program executing means which processes a plurality of tasks by multi-tasking; and
    a task table which keeps, for each of said plurality of tasks, at least the following information:
        a) grouping information according to a task group in which the task is included, said task group being either a machine monitoring group including a task for monitoring a device and a task for processing communications with an external device or a machine controlling group including a task for controlling operation of a device, and
        b) state information specifying one of various states in which the task is active, said various states including a state of execution and a state of temporary stop; wherein
    said program executing means includes emergency stop means and temporary stop means as a safety function,
    said emergency stop means accesses said task table in accordance with an emergency stop instruction to identify a task group that includes each task, terminates a task included in the machine controlling group and updates contents of said task table;
    said temporary stop means accesses said task table in accordance with a temporary stop instruction to identify a task group that includes each task, temporarily stops a task included in the machine controlling group and updates contents of said task table; and said temporary stop means has a function to continue an executing state of a task included in the machine monitoring group.

3. A multi-tasking system for controlling a plurality of tasks, comprising:
    a program executing means which processes a plurality of tasks by multi-tasking; and
    a task table which keeps, for each of said plurality of tasks, at least the following information:
        a) grouping information according to a task group in which the task is included, said task group being either a machine monitoring group including a task for monitoring a device and a task for processing communications with an external device or a machine controlling group including a task for controlling operation of a device, and
        b) state information specifying one of various states in which the task is active, said various states including a state of execution and a state of temporary stop, wherein
    said program executing means includes an emergency stop means as a safety function;
    said emergency stop means accesses said task table in accordance with an emergency stop instruction to identify a task group that includes each task, terminates a task included in the machine controlling group and updates contents of said task table; and
    said emergency stop means has a function to continue an executing state of a task included in the machine monitoring group.

4. The multi-tasking system according to any one of claim 1 to claim 3, further comprising a display means for displaying contents of said task table.

5. A multi-tasking system for controlling a plurality of tasks, comprising:
- a program executing means which processes a plurality of tasks by multi-tasking; and
- a task table which keeps, for each of said plurality of tasks, at least the following information:
  - a) grouping information according to a task group in which the task is included, said task group being either a machine monitoring group including a task for monitoring a device and a task for processing communications with an external device or a machine controlling group including a task for controlling operation of a device, and
  - b) state information specifying one of various states in which the task is active, said various states including a state of execution and a state of temporary stop; wherein said program executing means includes a temporary stop means as a safety function;

said temporary stop means accesses said task table in accordance with a temporary stop instruction to identify a task group that includes each task, temporarily stops a task included in the machine controlling group and updates contents of said task table; and said temporary stop means has a function to continue an executing state of a task included in the machine monitoring group.

6. A computer readable medium encoded with executable instructions representing a computer program for execution in a computer system having a task table and a program execution means for processing a plurality of tasks by multi-tasking, wherein said computer program includes steps of:

storing, in said task table for each of said plurality of tasks, grouping information according to a task group in which the task is included, said task group being either a machine monitoring group including a task for monitoring a device and a task for processing communications with an external device or a machine controlling group including a task for controlling operation of a device, and state information specifying one of various states in which the task is active, said various states including a state of execution and a state of temporary stop;

accessing said task table in accordance with an emergency stop instruction to identify the task group that includes each task, terminate a task included in the machine controlling group and update contents of said task table; and accessing said task table in accordance with a temporary stop instruction to identify the task group that includes each task, temporarily stop a task included in the machine controlling group and update contents of said task table.

7. A computer readable medium encoded with executable instructions representing a computer program for execution in a computer system having a task table and a program execution means for processing a plurality of tasks by multi-tasking, wherein said computer program includes steps of:

storing, in said task table for each of said plurality of tasks, grouping information according to a task group in which the task is included, said task group being either a machine monitoring group including a task for monitoring a device and a task for processing communications with an external device or a machine controlling group including a task for controlling operation of a device, and state information specifying one of various states in which the task is active, said various states including a state of execution and a state of temporary stop, and accessing said task table in accordance with a temporary stop instruction to identify the task group that includes each task, temporarily stop a task included in the machine controlling group and update contents of said task table.

8. A computer readable medium encoded with executable instructions representing a computer program for execution in a computer system having a task table and a program execution means for processing a plurality of tasks multi-tasking, wherein said computer program includes steps of:

storing, in said task table for each of said plurality of tasks, grouping information according to a task group in which the task is included, said task group being either a machine monitoring group including a task for monitoring a device and a task for processing communications with an external device or a machine controlling group including a task for controlling operation of a device, and state information specifying one of various states in which the task is active, said various states including a state of execution and a state of temporary stop; and accessing said task table in accordance with an emergency stop instruction to identify the task group that includes each task, terminate a task included in the machine controlling group and update contents of said task table.

9. A processing apparatus controlled by a plurality of tasks, comprising:

a program executing means which processes said plurality of tasks by multi-tasking;

a task table which keeps, for each of said plurality of tasks, at least the following information:
  - a) grouping information according to a task group in which the task is included, said task group being either a machine monitoring group including a task for monitoring a device and a task for processing communications with an external device or a machine controlling group including a task for controlling operation of a device, and
  - b) state information specifying one of various states in which the task is active, said various states including a state of execution and a state of temporary stop; and a first device controlled by a task included in said machine controlling group; and a second device monitored by a task included in said machine monitoring group, wherein said program executing means includes an emergency stop means and a temporary stop means as a safety function;

said emergency stop means stops operation of said first device at once in accordance with an emergency stop instruction and subsequently accesses said task table to identify the task group that includes each task, terminates a task included in the machine controlling group and updates contents of said task table;

said temporary stop means temporarily stops operation of said first device at once in accordance with a temporary stop instruction and subsequently accesses said task table to identify the task group that includes each task, temporarily stops a task included in the machine controlling group and updates contents of said task table; and said emergency stop means and temporary stop means have a function to continue an executing state of a task included in the machine monitoring group so as to monitor said second device continuously.

10. A processing apparatus controlled by a plurality of tasks, comprising:

a program executing means which processes said plurality of tasks by multi-tasking;

a task table which keeps, for each of said plurality of tasks, at least the following information:
  a) grouping information according to a task group in which the task is included, said task group being either a machine monitoring group including a task for monitoring a device and a task for processing communications with an external device or a machine controlling group including a task for controlling operation of a device, and
  b) state information specifying one of various states in which the task is active, said various states including a state of execution and a state of temporary stop; and a first device controlled by a task included in said machine controlling group; and a second device monitored by a task included in said machine monitoring group, wherein said program executing means includes a temporary stop means as a safety function;

said temporary stop means temporarily stops operation of said first device at once in accordance with a temporary stop instruction and subsequently accesses said task table to identify the task group that includes each task, temporarily stops a task included in the machine controlling group and updates contents of said task table; and said temporary stop means has a function to continue an executing state of a task included in the machine monitoring group so as to monitor said second device continuously.

11. A processing apparatus controlled by a plurality of tasks, comprising:

a program executing means which processes said plurality of tasks by multi-tasking;

a task table which keeps, for each of said plurality of tasks, at least the following information:
  a) grouping information according to a task group in which the task is included, said task group being either a machine monitoring group including a task for monitoring a device and a task for processing communications with an external device or a machine controlling group including a task for controlling operation of a device, and
  b) state information as to one of various states in which the task is active, said various states including a state of execution and a state of temporary stop; and a first device controlled by a task included in said machine controlling group; and a second device monitored by a task included in said machine monitoring group, wherein said program executing means includes an emergency stop means as a safety function;

said emergency stop means stops operation of said first device at once in accordance with an emergency stop instruction and subsequently accesses said task table to identify the task group that includes each task, terminates a task included in the machine controlling group and updates contents of said task table; and said emergency stop means has a function to continue an executing state of a task included in the machine monitoring group so as to monitor said second device continuously.

* * * * *